UNITED STATES PATENT OFFICE.

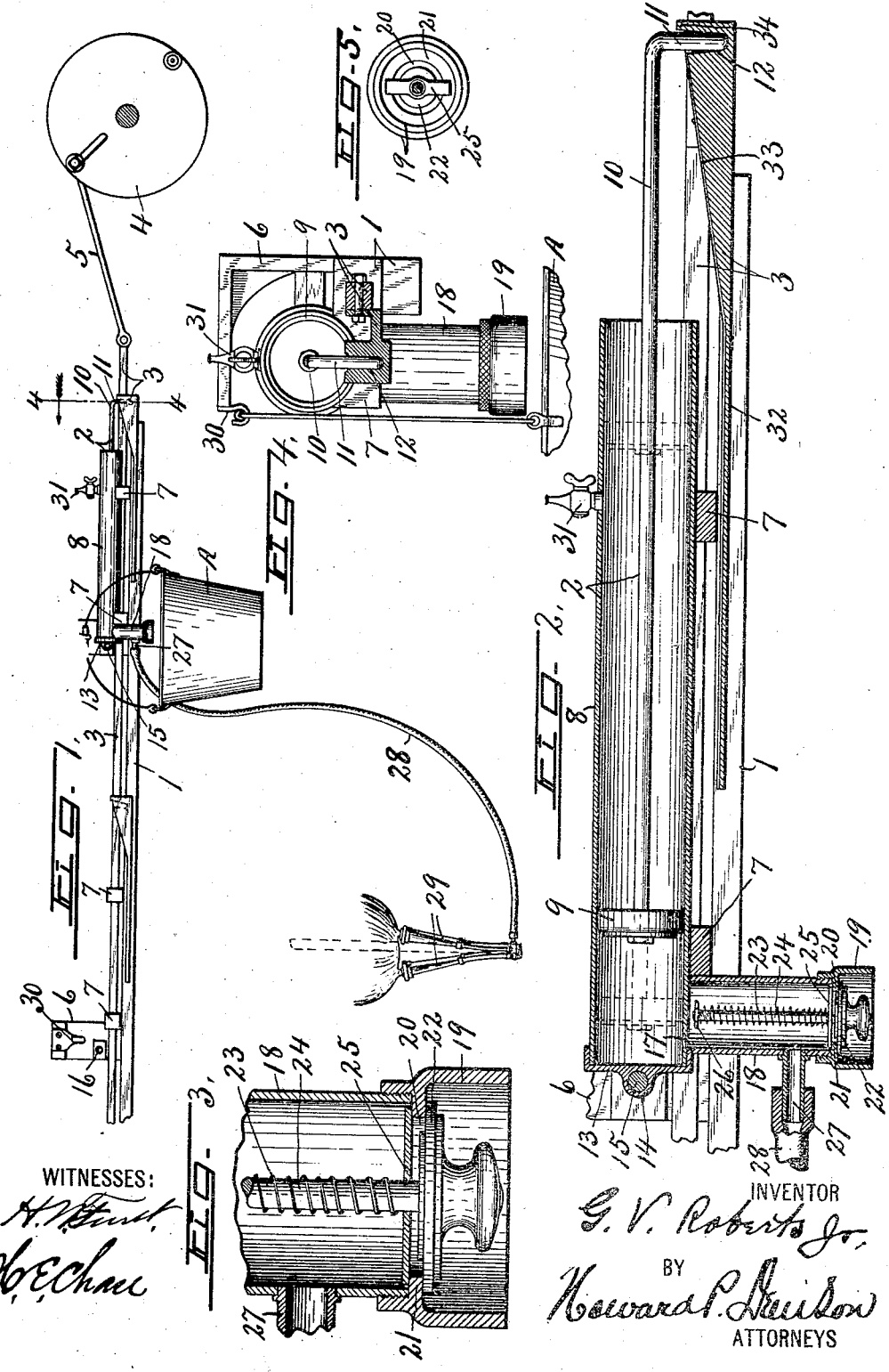

GEORGE V. ROBERTS, JR., OF PORT BYRON, NEW YORK.

MILKING APPARATUS.

1,074,206.

Specification of Letters Patent. Patented Sept. 30, 1913.

Application filed March 8, 1912. Serial No. 682,431.

*To all whom it may concern:*

Be it known that I, GEORGE V. ROBERTS, Jr., of Port Byron, in the county of Cayuga, in the State of New York, have invented new and useful Improvements in Milking Apparatus, of which the following, taken in connection with the accompanying drawings, is a full, clear, and exact description.

This invention relates to certain improvements in milking machines in which the teat cups are flexibly connected directly to an elevated pump through the medium of a hose of sufficient length to permit the cow to shift its position over a reasonably broad area of floor space without liability of detaching the cups or overstraining any of the connections between said cups and pump.

The main object is to render the entire apparatus more sanitary than has heretofore been practised by elevating practically all of the elements including the milk receptacle a sufficient distance above the floor to avoid contamination of the milk and various parts of the apparatus by the lower strata of foul or vitiated air.

Another object is to provide for a greater range of activity of the cow during the milking operation without liability of overturning the milk receptacle or overstraining any of the parts of the apparatus.

A further object is to provide the elevated pump with a relatively short branch chamber to which the flexible tube is connected for constant communication between the pump and teat cups and at the same time providing such branch chamber with an outlet in which is located a self-closing valve adapted to be opened on the compression stroke of the piston of the pump to discharge the milk into an underlying receptacle.

A still further object is to provide for the adjustment of the valve closing means whereby a certain degree of compressed air will be forced through the flexible tube and into the teat cups during part of the compression stroke of the piston before the valve opens so as to allow the teats to assume their normal condition after each exhaust stroke of such piston, thereby relieving the teats and udder from excessive irritation.

Other objects and uses relating to specific parts of the apparatus will be brought out in the following description:

In the drawings—Figure 1 is a side elevation of a milking apparatus embodying the various features of my invention in operative position for milking. Fig. 2 is an enlarged longitudinal vertical sectional view of the pump, showing the valve in the outlet and the reciprocatory actuating means for the piston. Fig. 3 is a still further enlarged detail sectional view of a portion of the branch tube of the pump showing the valve therein. Fig. 4 is a transverse vertical sectional view through the connection between the piston head and its actuating member showing the cylinder in end elevation and also the supporting means for the milk receptacle. Fig. 5 is a top plan of the detached cap for the branch tube of the pump.

In order that my invention may be clearly understood I have shown a substantially horizontal frame —1— for receiving and supporting a plunger pump —2— and a reciprocatory rod or bar —3— which is actuated by a hand or power driven crank or eccentric —4—, and pitman —5—, the rod or bar —3— being connected to the piston rod for reciprocating the piston in a manner hereinafter described.

The frame —1— is preferably supported upon the stanchions, not shown, or other part of the stable a considerable distance above the floor but within easy reaching distance of the operator and for this purpose is provided with suitable supporting brackets —6— having guides —7— in which the piston operating member —3— is slidable.

The pump —2— preferably consists of a cylinder —8— and piston —9— having a piston rod —10— provided with a lateral offset —11— adapted to enter one or the other of a series of apertures —12— in the operating rod —3— whereby reciprocatory motion may be transmitted from said rod to the piston. The cylinder —8— is preferably supported in a horizontal position in suitable seats in the upper sides of the guides —7— as shown more clearly in Figs. 2 and 4 and is preferably of greater length than the stroke of the piston for a purpose hereinafter described, one end of the cylinder being closed by a head or cap —13— having an apertured boss —14— for receiving and supporting a pin —15— which latter is inserted in a suitable aperture —16— in one of the brackets —6— for holding the pump against endwise movement as its piston is reciprocated. The cows are usually positioned side by side in the stanchions and in order that the same pump may be used for milking the several cows in sequence or selectively, it is made comparatively light and easily portable and adapted to be shifted to different positions in proximity to the cow being milked from one to another of the cows according to their relative arrangement as each cow is successively milked and for this purpose the pin —15— is easily removable and adapted to be inserted in any one of the apertures —16— of the several brackets, it being understood that each bracket has associated therewith a pair of supports —7— upon which the pump rests in addition to the supporting pin —15—. The opposite end of the cylinder is preferably open to obviate any possibility of forming an air cushion or partial vacuum in this end of the cylinder, thereby permitting the free operation of the piston with a minimum degree of power.

The lower side of the closed end of the cylinder is provided with a relatively small opening —17— communicating with a relatively short branch tube —18— which is secured to and depends from the lower side of the cylinder so as to embrace the opening —17— but is preferably of considerably greater diameter than said opening to constitute a reservoir for the reception of a limited quantity of milk. This opening —17— is preferably located at one side of the axis of the branch tube —18— nearest the head —13— so as to allow the piston to move across the greater portion of the upper end of the tube, thereby permitting the full stroke of the piston without excessively elongating the cylinder. The lower end of the branch tube —18— is provided with a removable cap —19— having an outlet —20— and a valve seat —21— against which is normally seated a self-closing valve —22—. This valve is adapted to open outwardly or downwardly under the action of the compressed air and milk produced by the necessary stroke of the piston —9— and is yieldingly held in its closed position by a spring —23— which surrounds an inwardly projecting stem —24— of the valve and has its lower end bearing against a suitable seat —25— and its upper end engaged with an adjustable shoulder —26— on the upper end of the rod, whereby the tension of the spring may be adjusted at will to vary the time of opening of the valve during the compression stroke of the piston.

The branch tube —18— is provided in one side with a laterally projecting tubular nipple —27— communicating with the interior of the tube —18— between the valve —22— and opening —17— and to this nipple is connected one end of a flexible tube —28— having its opposite end connected to a series of, in this instance four, teat cups —29— as shown more clearly in Fig. 1, thereby establishing constant communication between the teat cups and head end of the cylinder.

The milk receptacle which may consist of an ordinary milk pail —A— is preferably supported a considerable distance above the floor of the stable directly under the lower end of the branch tube —18— and for this purpose each of the brackets —6— is provided with a laterally projecting hook —30— to which the bail of the pail may be readily attached or removed at will as the pump is shifted from one bracket to another. In other words the pail is entirely separate from the pump and either may be removed or replaced independently of the other so that in case the pail should be filled during the process of milking any one cow, it may be removed and replaced by an empty or partially filled pail without changing the position of the pump or the filled pail may be left in this position and the pump shifted and used to fill another pail on any one of the other brackets if desired. The pail is therefore elevated a considerable distance above the cow or plane of the teat cups during the milking operation, thereby not only obviating any liability of contamination of the milk by the lower strata of the foul or vitiated air but also preventing any possibility of accidentally overturning the milk receptacle by either the cow or attendant.

The cylinder —2— is provided with an air inlet valve —31— located between the inward and outward limits of stroke of the piston —9— and preferably in proximity to the limit of the outward stroke of said piston so as to neutralize the partial vacuum in the head end of the cylinder boss before the piston reaches the limit of its outward stroke, thereby relieving in a measure the action of the vacuum or suction upon the udder.

It is now evident that as the piston is moved to the limit of its outward stroke, atmospheric air is admitted to the interior of the cylinder in advance of the piston and is slightly compressed during the compression stroke of said piston in proportion to the spring —23—, thereby additionally restoring the teats to their normal relaxed condition and preventing excessive irritation thereof such as would be the case without such limited compression. This slight compression is afforded by the tension of the spring —23— during the compression stroke of the piston but is sufficiently yielding to allow the valve to open for the discharge of the milk into the receptacle —A— after the piston —9— has passed the valve —31— a short distance on its compression stroke, and to remain open until said piston reaches the end of such stroke, whereupon it is immediately closed by the spring. For example, assuming that the cups —29— are attached to the udder in the usual manner, the suction produced by the outstroke of the piston from the limit of its instroke produces sufficient suction through the flexible hose —28— and cups —29— to draw the milk from the udder into the chamber —18—, the suction continuing until the piston passes the vent —31— and serves to assist the spring —23— in keeping the valve —22— closed, whereupon as soon as the piston —9— passes the normally open valve —31—, atmospheric air will be admitted to the interior of the cylinder between the piston and head —13—, thereby breaking the partial vacuum and relieving the draft upon the teats. During this exhaust stroke of the piston the teats are drawn downwardly more or less into the cups and are therefore elongated tending to produce a certain amount of irritation and in practice it is found that unless some counteracting force is introduced into the cups to return the teats to their normal condition, they will remain in this elongated position by reason of their friction with said cups until the next exhaust stroke which in turn assists to additionally elongate or stretch the teats and produces more or less irritation thereof. This injurious effect, however, is overcome in my apparatus by admitting atmospheric air to the interior of the cylinder and therefore into the cups just before the piston reaches the limit of its exhaust stroke, thereby tending to relieve the suction so that when the piston begins to return upon its compression stroke as soon as it passes the valve —31— it tends to force air under a slight pressure into the cups sufficiently to relieve the suction on the teats and allow them to return to their normal condition, this partial compression of the air in the cups —29— being regulated by the tension of the spring —23— but as the compression increases by the inward action of the piston —9—, the valve —22— will thereby be opened to allow the exit of the milk from the reservoir —18— into the receptacle —A—. This particular feature of my invention therefore causes the teats to elongate and retract gradually and gently in the natural manner of milking by hand and therefore obviates any liability of irritation of the udder.

When the pump is operated by power other than hand power, such operation is usually continuous and in order that the pump may be shifted from one position to another according to the position of the cow as previously described and that the piston rod may be easily attached to and detached from the constantly reciprocating driving member —3— without liability of damage to any of the parts, I provide said reciprocating member with a ledge —32— and inclined bearing —33— terminating in a shoulder —34—, the length of the bearings —32— and —33— being sufficient to enable the operator to drop the offset —11— on any portion thereof with the assurance that the offset will strike the abutment —34— and immediately enter the aperture as soon as the latter is registered with said offset, it being understood that without some such provision it would require careful manipulation and watchfulness to properly enter the offset —11— into the aperture —12— while the driving member —3— is reciprocating.

What I claim is:

1. In a milking apparatus, the combination of a pump having an outlet, actuating means therefor, teat cups, a flexible hose leading from the teat cups to the pump, said pump being elevated some distance above the cups, and means for supporting a milk receptacle in the path of the outlet and in a plane above the cups.

2. In a milking apparatus, in combination with teat cups, a pump supported in a plane some distance above that of the cups when the latter are adjusted for use, a hose having one end connected to the cups and its other end connected directly to the pump, said pump having a piston rod provided with a lateral offset, a sliding bar movable lengthwise of the pump, means for reciprocating said bar, an inclined bearing on the bar terminating in an abutment and having an aperture for the reception of the offset at the junction of the abutment with the inclined bearing.

3. In a milking apparatus, a piston pump having a milk outlet and a valveless milk inlet, a spring closed valve for the outlet, teat cups, and a flexible valveless connection between the teat cups and milk inlet.

In witness whereof I have hereunto set my hand on this 1st day of March 1912.

GEO. V. ROBERTS, Jr.

Witnesses:
H. E. CHASE,
E. S. TUCKER.